Jan. 26, 1937.    G. H. HUFFERD    2,068,917
TRIANGULAR SOCKET JOINT
Filed Nov. 9, 1935
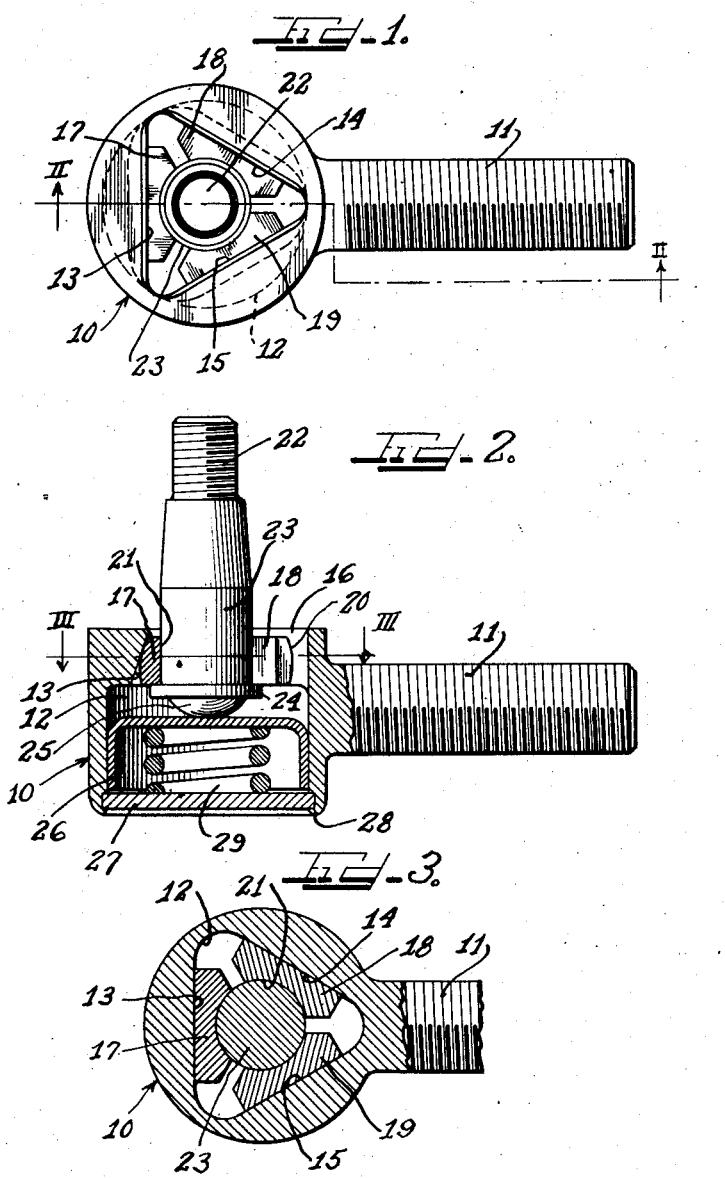
Inventor
George H. Hufferd.
by Charles H. Wills Attys.

Patented Jan. 26, 1937

2,068,917

UNITED STATES PATENT OFFICE 2,068,917

TRIANGULAR SOCKET JOINT

George H. Hufferd, Detroit, Mich., assignor to Thompson Products, Incorporated, Cleveland, Ohio, a corporation of Ohio Application November 9, 1935, Serial No. 48,999

8 Claims. (Cl. 287—90)

This invention relates to oscillatory joints adapted for use in tie-rod connections for steering apparatus of automotive vehicles.

More specifically, this invention relates to tie-rod joints composed of inexpensively machined elements providing the necessary bearing surfaces for universal movement.

Heretofore, in the manufacture of tie-rod joints, it was considered necessary to form the stud member of such joint with an accurately machined ball end. The cost of producing such a ball-ended stud is excessive and furthermore both the rotating and tilting movements of the stud relatively to the housing were necessarily borne by the ball end of the stud and the ball socket of the housing. Tilting movement of the stud relatively to the housing caused the spherical bearing surfaces of the ball joints to wear away in the direction of tilt, thereby preventing a smooth rotation of the stud about its own axis, since the tilting movement caused the ball end of the stud to assume an oval shape.

I have now provided tie-rod joints at low cost in which the stud member rotates about its own axis on a cylindrical bearing surface and tilts relatively to the housing on separate sets of bearing surfaces. The joints of this invention are equipped with a plurality of spaced seating members having segmental cylindrical inner faces defining bearing surfaces for a cylindrical stud. These seating elements are mounted in a housing having converging walls disposed at an angle to each other and preferably forming a triangle. The tilting movements of the studs are thus borne by the outer faces of the seating blocks and the angularly disposed converging walls in the housing.

It is, therefore, an object of this invention to provide oscillatory joints having stud members rotatably mounted in a plurality of seating blocks, which blocks are tiltably mounted at an angle to each other in a housing.

Another object of this invention is to provide a tie-rod joint having a triangular socket for receiving three seating blocks in tiltable relation to the housing, which blocks in turn receive the stud of the joint in rotatable relation thereto.

Another object of this invention is to provide a tie-rod joint in which the tilting movements of the studs are borne by triangularly disposed bearing surfaces.

Another object of this invention is to provide a triangular socket joint utilizing separate sets of bearing surfaces for tilting movement and for rotatable movement of the stud.

Another object of this invention is to provide a tie-rod joint at a lower cost to manufacture than the heretofore used ball joints and having enhanced wearing properties.

Other and further objects of this invention will become apparent from the following detailed description of the annexed sheet of drawings which disclosed a preferred embodiment of the invention.

On the drawing:

Figure 1 is a top plan view of a joint assembly according to this invention.

Figure 2 is a vertical cross-sectional view, with parts in elevation, taken substantially along the line II—II of Figure 1.

Figure 3 is a horizontal cross-sectional view with parts in elevation and parts broken away, taken substantially along the line III—III of Figure 2.

As shown on the drawing:

In Figures 1 to 3, inclusive, the reference numeral 10 indicates a housing for the joint of this invention having a laterally extending threaded shank 11 adapted to be threaded into the end of a tie-rod. The housing 10 is provided with a cylindrical axial bore 12 extending therethrough and having frusto-conical walls 13, 14 and 15, respectively, at one end thereof defining a restricted triangular opening 16 to the housing. The frusto-conical walls 13, 14 and 15 are angularly disposed from each other and are connected at the ends by the cylindrical bore 12, as shown in Figure 3.

Seating blocks 17, 18 and 19 are disposed in bearing engagement with each frusto-conical wall 13, 14 and 15, respectively. The seating blocks are spaced from each other, as shown in Figures 1 and 3, and each have outer segmental cylindrical bearing faces 20 and inner segmental cylindrical bearing faces 21. The outer segmental cylindrical faces 20 of the seating blocks 17, 18 and 19 have a line contact with the frusto-conical walls 13, 14 and 15, and the seating blocks are therefore tiltable relatively to the housing 10. Alternatively, the walls 13, 14 and 15 may be provided with a segmental cylindrical face for receiving the segmental cylindrical faces of the seating blocks, or the segmental cylindrical faces of the walls can receive frusto-conical faces of the seating blocks. Any of these arrangements permits relative tilting movement between the seating blocks and the joint housing.

A stud member 22 projects freely from the housing 10 and has a cylindrical bearing portion 23 in the housing in bearing engagement with the segmental cylindrical faces of the seating blocks 17, 18 and 19. A collar or outturned rim 24 is provided on the stud member 22 beneath the bearing surface 23 thereof, as shown in Figure 2. This collar 24 abuts the bottoms of the seating blocks 17, 18, and 19.

The end of the stud 22 has a segmental ball 25 depending therefrom which is seated on a dished cup member 26 which is slidably mounted in the bore 12 of the housing 10. A closure plate 27 is spun into the bottom of the housing 10, as shown at 28, for closing the housing. A coiled spring 29 is maintained under compression in the cup member 26 between the plate 27 and the member 26 for urging the cup member 26 against the ball end 25 of the stud.

The stud member is thus urged in the direction of convergence of the walls 13, 14 and 15, and the collar 24 on the stud moves the seating blocks 17, 18 and 19 into a full bearing engagement with the converging frusto-conical walls.

From the above description, it should be understood that the stud 22 is freely rotatable about its own axis on the segmental cylindrical bearing surfaces formed on the inner faces of the seating blocks while at the same time the stud is freely tiltable in all directions on the bearing surfaces provided by the triangularly arranged frusto-conical walls of the housing and segmental cylindrical outer faces of the seating blocks. The coiled spring maintains the joint elements in full bearing engagement with each other and automatically compensates for any wear of the bearing surfaces.

The seating blocks can be manufacture at low cost and the cylindrical stud is, of course, made without difficulty at much less expense than the usual ball ended stud. The frusto-conical wall in the housing can be formed integral with the housing, as shown in the drawing, or can be a separate member pressed into the housing which would then be provided with a straight cylindrical bore extending across the entire depth of the housing.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. A joint comprising a housing having a plurality of separate converging walls therein at one end thereof, said walls being disposed at an angle to each other, a stud extending from said housing in free rotatable and tiltable relation thereto and having a cylindrical bearing portion in the housing, a plurality of seating blocks having outer faces in tiltable bearing engagement with the converging walls of the housing, and segmental cylindrical inner faces in bearing engagement with the cylindrical portion of the stud, and means urging the stud in the direction of convergence of the walls in the housing to maintain the joint elements in operative assembly.

2. A joint comprising a housing having a plurality of separate converging walls therein disposed at an angle to each other and defining a set of individual bearing surfaces, seating blocks having outer faces defining a second set of individual bearing surfaces, each of said individual bearing surfaces of the blocks being in bearing engagement with one of said individual bearing surfaces of the converging walls, one of said sets of bearing surfaces being segmental cylindrical in shape whereby the seating blocks can tilt relative to the housing, a stud extending through said seating blocks in free rotatable relation therein, and means for urging said seating blocks in the direction of convergence of the walls in the housing to maintain the joint in operative assembly.

3. A joint comprising a socket having a bore extending therethrough with triangularly disposed bearing surfaces at one end thereof, said triangularly disposed bearing surfaces converging in the same general direction, a plurality of seating elements in bearing engagement with said bearing surfaces having segmental cylindrical inner bearing faces, a stud projecting freely from said housing having a cylindrical bearing surface engaging the inner faces of said seating elements, an enlarged base portion engaging the edges of said seating elements, and resilient means in said housing for urging the stud in the direction of convergence of the socket bearing surfaces for maintaining the joint elements in operative assembly.

4. A tie-rod joint comprising a housing having a stud projecting freely therefrom, said stud having a cylindrical bearing surface disposed in said housing, a plurality of seating blocks having segmental cylindrical inner faces in bearing engagement with the bearing portion of said stud, said seating blocks being in spaced relation around said stud and being disposed at an angle to each other, said housing having a separate converging wall for each of said blocks in bearing engagement with the outer faces of said seating blocks, said walls being disposed at an angle to each other, and resilient means in said housing for maintaining said joint elements in operative assembly.

5. A tie-rod joint comprising a housing having means for connection to a tie-rod and having a cylindrical socket with triangularly disposed converging walls at one end thereof, a seating block in tiltable relation to each of said triangularly disposed walls, each of said seating blocks having a segmental cylindrical inner face, and a stud projecting through said seating blocks having a cylindrical bearing portion in bearing engagement with the inner faces thereof, and means for resiliently urging said joint elements into operative assembly.

6. A tie-rod joint comprising a socket having three converging walls at one end thereof defining a triangle, three seating blocks in said socket in tiltable relation to said converging walls, said seating blocks being in spaced relation to each other and having segmental cylindrical inner faces, a stud projecting through said seating blocks having a cylindrical bearing portion in engagement with the segmental cylindrical faces of said blocks, and spring means in said socket urging said joint elements into operative assembly.

7. A tie-rod joint comprising a housing having a laterally extending shank for connection to the end of a tie rod and a socket portion provided with three angularly disposed converging walls defining a triangle, three seating blocks in said socket in tiltable engagement with said converging walls, said seating blocks being in spaced relation from each other and having segmental cylindrical inner faces, a stud extending through said seating blocks having a cylindrical bearing portion in bearing engagement with the segmental cylindrical inner faces thereof and having a collar abutting the edges of said seating blocks, a segmental ball end on said stud, a dished cup member slidable in said housing into engagement with said ball end, and a spring member for urging said dished cup member against the ball end of said stud to move the stud in the direction of convergence of said three walls in the socket to thereby maintain the joint elements in operative assembly.

8. A tie-rod joint comprising a stud having a cylindrical bearing portion, three seating blocks disposed around said cylindrical bearing portion in spaced relation to each other, said seating blocks having inner segmental cylindrical bearing faces in bearing engagement with the cylindrical portion of the stud, a housing having three converging walls at one end thereof for receiving the seating blocks in tiltable relation thereto, and means in said housing urged against the end of said stud for maintaining the joint elements in operative assembly.

GEORGE H. HUFFERD.